(12) United States Patent
Glencross

(10) Patent No.: US 9,858,770 B2
(45) Date of Patent: Jan. 2, 2018

(54) PROJECTED DOORBELL SWITCH NOTIFICATIONS

(71) Applicant: Christopher John Glencross, Alpharetta, GA (US)

(72) Inventor: Christopher John Glencross, Alpharetta, GA (US)

( * ) Notice: Subject to any disclaimer, the term of this patent is extended or adjusted under 35 U.S.C. 154(b) by 0 days.

(21) Appl. No.: 15/135,069

(22) Filed: Apr. 21, 2016

(65) Prior Publication Data

US 2016/0314663 A1 Oct. 27, 2016

Related U.S. Application Data

(60) Provisional application No. 62/150,323, filed on Apr. 21, 2015.

(51) Int. Cl.
| | |
|---|---|
| *G08B 3/10* | (2006.01) |
| *G03B 21/14* | (2006.01) |
| *G08B 25/00* | (2006.01) |

(52) U.S. Cl.
CPC .............. *G08B 3/10* (2013.01); *G03B 21/14* (2013.01); *G08B 25/008* (2013.01)

(58) Field of Classification Search
CPC ......... G03B 21/14; G08B 25/008; G08B 3/10
USPC ....................................................... 340/328
See application file for complete search history.

(56) References Cited

U.S. PATENT DOCUMENTS

| | | | | | |
|---|---|---|---|---|---|
| 5,517,264 | A | * | 5/1996 | Sutton ..................... | F21S 8/035 353/119 |
| 5,521,578 | A | * | 5/1996 | DelValle .................. | G08B 5/36 340/286.01 |
| 9,360,668 | B2 | * | 6/2016 | Rodriguez Moreno ............ | G02B 27/0101 |
| 2001/0043313 | A1 | * | 11/2001 | Okura .................. | G03B 21/001 353/97 |
| 2004/0125348 | A1 | * | 7/2004 | Carkner ................. | G03B 21/30 353/119 |
| 2009/0284960 | A1 | * | 11/2009 | Chien .................. | H04N 5/2354 362/157 |
| 2010/0329247 | A1 | * | 12/2010 | Kennedy .............. | H04B 1/7163 370/389 |
| 2015/0179049 | A1 | * | 6/2015 | Franusich ............ | G08B 25/016 340/6.1 |
| 2016/0218884 | A1 | * | 7/2016 | Ebrom .................... | D06F 33/02 |

* cited by examiner

*Primary Examiner* — Nader Bolourchi

(57) ABSTRACT

A doorbell switch including a projector is described. The doorbell switch can be configured to provide a first or automated display state of the projector based on one or more rules or predefined conditions defined at a client device, state conditions of a security system, or another backend the computing system, as well as various time of day, sensor, and other conditions. The automated display state can change over time in response to changes in the operation and/or status of various systems. Additionally, the doorbell switch can be configured to provide a second or actuated display state in response to the actuation of the doorbell switch.

20 Claims, 3 Drawing Sheets

PROJECTED DOORBELL SWITCH NOTIFICATIONS

CROSS-REFERENCE TO RELATED APPLICATIONS

This application claims the benefit of U.S. Provisional Patent Application No. 62/150,323, titled "PROJECTED DOORBELL SWITCH NOTIFICATIONS," filed Apr. 21, 2014, the entire contents of which are hereby incorporated herein by reference.

BACKGROUND

A doorbell is a signaling device often placed in a house or other building. When an individual presses a button on a doorbell switch of the doorbell, the doorbell may ring, alerting those inside the house as to the presence of the individual at the door. Most modern doorbells are electric and actuated by an electrically-actuated doorbell switch.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
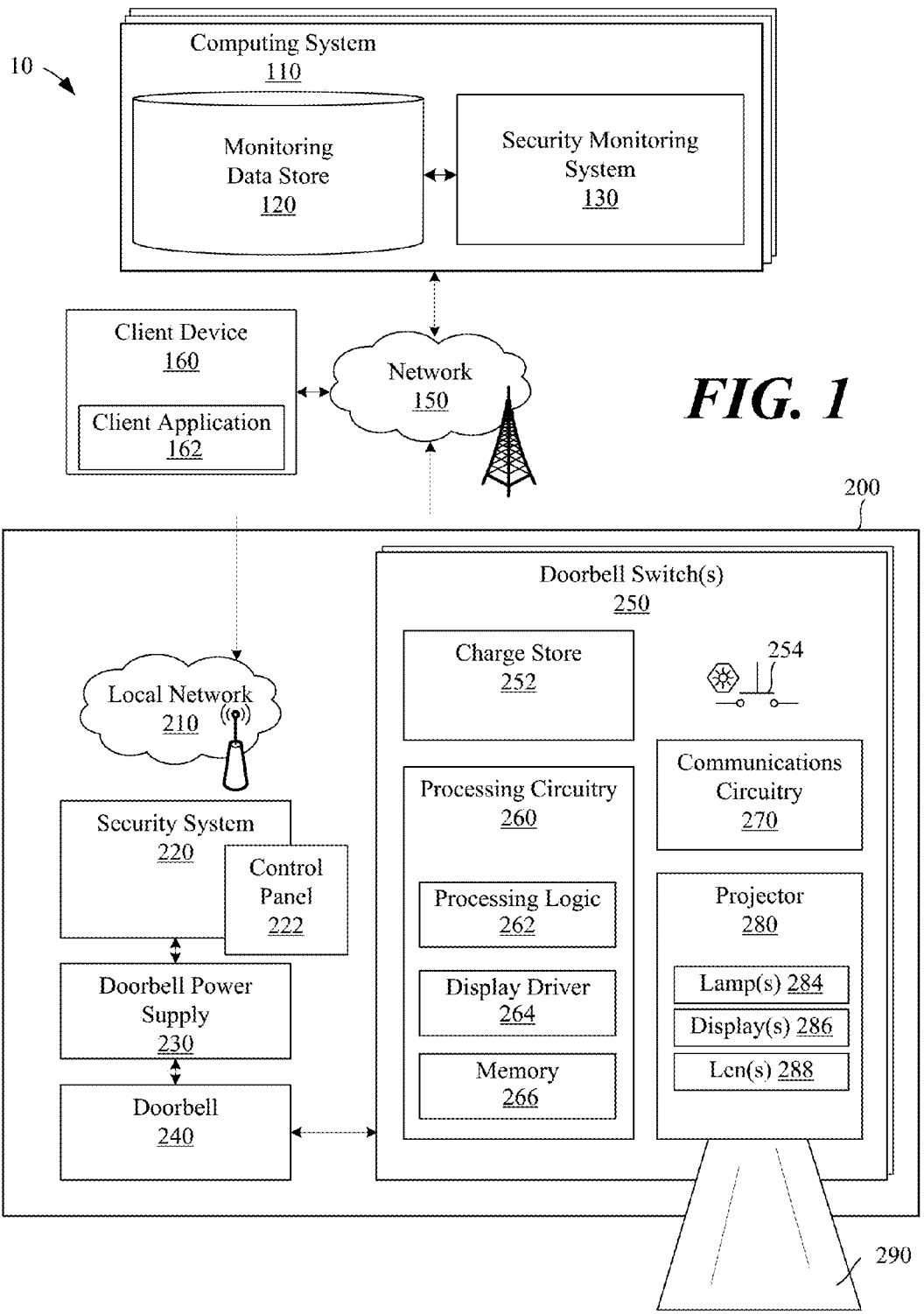
FIG. 1 illustrates a system for projected doorbell switch notifications according to an example embodiment of the present disclosure.

FIG. 1 illustrates a system 10 for projected doorbell switch notifications according to an example embodiment of the present disclosure. The system 10 includes a computing system 110, a network 150, a client device 160, and various components maintained at the location 200. As illustrated, the computing system 110 includes a monitoring data store 120 and a security monitoring system 130, and the client device 160 includes a client application 162. The location 200 is representative of a house, commercial or residential building, or any other building, without limitation. The components maintained at the location 200 include a local network 210, a security system 220 with control panel 222, a doorbell power supply 230, at least one doorbell 240, and one or more doorbell switches 250.

The computing system 110 can be embodied as one or more computers, computing devices, or computing systems. In certain embodiments, the computing system 110 can include one or more computing devices arranged, for example, in one or more server or computer banks. The computing device or devices can be located at a single installation site or distributed among different geographical locations. The computing system 110 can include a plurality of computing devices that together embody a hosted computing resource, a grid computing resource, and/or other distributed computing arrangement. In some cases, the computing system 110 can be embodied as an elastic computing resource where an allotted capacity of processing, network, storage, or other computing-related resources vary over time.

The monitoring data store 120 can be embodied as any suitable device(s) capable of storing data related to the operation of the computing system 110, and the security monitoring system 130 can be embodied as any applications or other computer-executable logic configured to perform the functions or processes described herein. As one example, the monitoring data store 120 can store data and/or data structures related to individuals subscribed to one or more monitoring service(s), such as home security/alarm monitoring or other types of service(s). Similarly, the security monitoring system 130 can include computer logic to provide feedback from, monitor the operations of, set configurations of, or control the operations of the services in connection with the securing system 220.

The network 150 can include the Internet, intranets, extranets, wide area networks (WANs), local area networks (LANs), wired networks, wireless (e.g., cellular, 802.11-based (WiFi), Bluetooth®, etc.) networks, cable networks, satellite networks, other suitable networks, or any combinations thereof. It is noted that the computing environment 110 can communicate with the client device 160 using various systems interconnect models and/or protocols such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), and/or other protocols for communicating data over the network 150, without limitation. Although not illustrated, the network 150 can include connections to any number of network hosts, such as web site servers, file servers, networked computing resources, databases, data stores, or any other network or computing architectures.

The client device 160 is representative of one or more client devices. The client device 160 can be embodied as any type of computing device, processing circuit, or processor based device or system including those embodied in the form of a desktop computer, laptop computer, personal digital assistant, cellular telephone, or tablet computer, among others. The client device 160 can include one or more system devices or subsystems, such as wireless communications transceivers, GPS receivers, orientation and acceleration sensors, etc. The client device 160 can also include one or more peripheral devices. In this context, the peripheral devices may include one or more devices, such keyboards, keypads, touch pads, touch screens, microphones, cameras, etc.

The client device 160 can execute various software packages and applications, such as the client application 162, among others. In the context of the embodiments described herein, the client application 162 can be embodied as an application to interface with the operations of the computing system 110, the security system 220, and/or the doorbell switch 250. For example, the client application 162 can provide one or more user interfaces to provide feedback from, monitor the operations of, set configurations of, or control the operations of the computing system 110, the security system 220, and/or the doorbell switch 250. In one embodiment, the client application 162 may be embodied as a hypertext-based internet browser. Thus, the client application 162 may render network pages and/or other user interfaces for interacting with the security monitoring system 130. In other cases, the client application 162 can be embodied as a dedicated application to provide feedback, monitor operations, and set configurations of one or more of the components in the system 10, such as the computing system 110, the security system 220, and/or the doorbell switch 250.

Turning to the components maintained at the location 200, the local network 210 can include any suitable wired and/or wireless LAN (e.g., 802.11-based (WiFi), Bluetooth®, Z-Wave®, Zigbee®, etc.) networks, using any suitable network protocols, and combinations thereof. Although not illustrated, the network 210 can include connections to any number of network hosts, such as website servers, file servers, networked computing resources, databases, data stores, or any other network or computing architectures.

The security system 220 may be embodied as any suitable system designed to detect intrusion, fire, or another event at the location 200. In that context, the security system 220 may provide some protection against burglary or property damage, for example. The security system 220 may include the control panel 222 for arming, disarming, and otherwise controlling the operation of the security system 220, as would be appreciated by those familiar with such systems. Although not illustrated in FIG. 1, the security system 220 may also include (and be integrated for use with) other peripheral elements, such as radio-frequency (RF) wireless communications subsystems, smoke detectors, gas detectors, thermostats, cameras, alarm horns, motion detectors, break detectors, etc.

The doorbell power supply 230 may be embodied as any suitable power transformer or other power supply, including related circuit or circuitry elements, to provide power for the operation (e.g., ringing) of the doorbell 240, for example, upon actuation of the doorbell button 254. In that context, the doorbell power supply 230 may be embodied as a step-down transformer and associated circuitry (e.g., rectifiers, etc.) which provides a 12V, 24V, or other suitable or industry-standard voltage to operate the doorbell 240. In many wired doorbell systems, a doorbell switch is relied upon to momentarily close a doorbell circuit between the doorbell switch, such as the doorbell switch 250, a transformer, such as the doorbell power supply 230, and a doorbell, such as the doorbell 240. Thus, in most doorbell circuits, a pair of conductors having a voltage is provided to the doorbell switch. The doorbell 240 in FIG. 1 may be embodied as any suitable doorbell, without limitation.

The doorbell switch 250 can include one or more of a charge store 252, a doorbell button 254, processing circuitry 260, communications circuitry 270, and a projector 280, although one or more of those can be omitted in various embodiments. Additionally, in some embodiments, the doorbell switch 250 can also include one or more cameras, speakers, microphones, and other components to facilitate two-way conversations between the doorbell switch and the client device 160, for example. The doorbell switch 250 can also include sensors, such as light (e.g., photocell), radar, motion, temperature, and other sensors, LED light indicators, fingerprint readers, keypads or touchpads, barcode or retinal scanners, etc. Further, in addition to (or in place of) the projector 280, the doorbell switch 250 can include a display device, such as a liquid-crystal display (LCD), a light-emitting diode (LED), or other suitable display device, controlled by the display driver 264 or another suitable display driver. Such a display device can be used, alternatively or additionally, to display images, text, video, or other information.

The doorbell switch 250 is coupled to the doorbell circuit described above, which includes the doorbell power supply 230 and the doorbell 240 among other circuit elements. The charge store 252 may be embodied as any component capable of storing electrical energy, such as one or more batteries, capacitors, or other elements. Through the doorbell circuit, the charge store 252 may capture energy from the doorbell power supply 230 at a relatively low rate over time. For example, while the doorbell circuit presents a voltage potential to the doorbell switch, a relatively small amount of current may be drawn from that source potential and used to charge the charge store 252. In that way, the capture of charge may not cause actuation of the doorbell 240. The charge stored by the charge store 252 may be relied upon to supply power to the processing circuitry 260, the communications circuitry 270, and the projector 280, among other components in the doorbell switch 250, in the event of the depression of the doorbell button 254 and/or a power outage, for example.

Among other components, the processing circuitry 260 can include processing logic 262, a display driver 264, and a memory 266. Further, among other parts, the projector 280 can include one or more lamps 284, displays 286, and lenses or lens assemblies 288, although one or more of those may be omitted in certain embodiments.

The processing circuitry 260 can be embodied as any general- or specific-purpose processing circuitry, such as a system-on-chip (SOC), microcontroller, gate array, application specific integrated circuit (ASIC), etc. The processing circuitry 260 can include a system and/or real time clock in some embodiments to display the current time and/or date. Further, the processing logic 262 is configured to direct the operation of the display driver 264 based on various predetermined logic conditions and/or rules. The display driver 264 is configured to direct the display provided by the projector 280 and, if present, any other display devices incorporated in the doorbell switch 250 as described herein. The memory 266 may be embodied as any suitable memory for storing instructions and/or data for processing by the processing circuitry 260.

In various embodiments, the memory 266 may be embodied as a random access and/or read-only memory, such as a magnetic media, solid-state, semiconductor, or other type of memory, which stores software for execution by the processing circuitry 260. Thus, in one embodiment, the processing circuitry 260 is configured to execute instructions stored in the memory 266 that, when executed, direct the processing circuitry 260 to perform aspects of the embodiments described herein. In the context of the doorbell switch 250, the terms "executable" or "for execution" refer to software forms that can ultimately be run or executed by the processing circuitry 260, whether in source, object, machine, or other form. The processing circuitry 260 can be embodied as multiple processors and/or multiple processor cores that operate in parallel, respectively, or in combination. Further, although not illustrated, the doorbell switch 250 can include one or more local interfaces that facilitate data communication between the processing circuitry 260, the communications circuitry 270, the projector 280, and other components of the doorbell switch 250. Additionally, in some cases, one or more of the processing circuitry 260, the communications circuitry 270, the projector 280, and other components can be mounted or secured to one or more printed circuit boards.

The communications circuitry 270 can be embodied as any suitable wireless communications physical layer device(s) (e.g., WiFi, Bluetooth®, Z-Wave®, Zigbee®, etc.)

receivers, transmitters, transceivers, etc.) and associated protocols for conducting wireless communications with the security system 220. Thus, the doorbell switch 250, the security system 210, and/or the local network 210 can conduct bidirectional data communications between each other.

As described herein, data communications sessions can be established between (e.g., among) the client device 160, the security monitoring system 130, and the computing system 110. For example, the security system 220 and/or the security monitoring system 130 can forward data to the client device 160 indicating that an individual has pressed the doorbell switch 250. Similarly, the security system 220 and/or the security monitoring system 130 can forward data related to the operations and/or configurations of the security system 220 and/or the security monitoring system 130, such as whether the security system 220 is armed or disarmed, whether the security system 220 has identified an alarm condition, etc.

The projector 280 may be embodied as an assembly that generates an illuminated projection 290 upon a surface. In various embodiments, the projector 280 may be mounted to a housing of the doorbell switch 250 using a rotatable mechanism, such as a rotatable turret or other similar structure. In that way, the projector 280 can be adjusted to illuminate the ground, a wall, a door, etc., regardless of the manner in which the doorbell switch 250 is mounted. The lamp 284 can be embodied as one or more lamps or light sources, such as one or more incandescent lamps, light emitting diodes (LEDs), lasers, hybrid lamps, or other light sources suitable to generate light for the illuminated projection 290. In some cases, the lamp 284 can include an array of lamps capable of casting light of various colors and intensities.

In one embodiment, the display 286 can include a transparent or semi-transparent sheet or lens having a design, logo, alpha-numeric message, or other image printed or formed in or upon it. Further, the lens or lens assembly 288 includes one or more converging- and/or diverging-focus lenses to cast the light from the lamp 284, after passing through the display 286, at a suitable spread distance and size from the doorbell switch 250. Thus, the projector 280 is configured to generate the illuminated projection 290, which may include the design, logo, alpha-numeric message, or other image on the display 286. In that context, the design or logo may include the design mark or logo of a company, such as a security or home monitoring company, for example. Thus, the illuminated projection 290 can provide a type of illuminated notification to individuals. In other cases, the illuminated projection 290 may indicate that a security system is present and/or armed, for example. Further, the illuminated notification can include company trade-, service-mark or other information.

In one embodiment, the display 286 may be static and predetermined. In other embodiments, however, the display 286 can be dynamic and change over time as directed by the display driver 264. For example, the display 286 can be embodied as a type of transparent LCD or LED display through which light from the lamps 284 passes. In other examples, the projector 280 may be embodied as a type of micro- or pico-projector. Examiners of suitable types of projectors, without limitation, include digital light processing (DLP), liquid crystal on silicon (LCoS), or laser-beam-steering (LBS) projectors. In that context, a DLP projector may include mirrors on a chip that direct light from a light source, where each mirror controls an amount of light for one pixel. Color may be added with a color wheel between the light source and the mirrors that splits the light into RGB components. A LCoS projector may use a small LCD display to control the amount of light for each pixel. As another example, a LBS projector may create an image one pixel at a time using a directed laser beam.

When the display 286 is dynamic, the illuminated projection 290 can be altered and updated over time by the processing circuitry 260, such as when the security system 220 is armed, disarmed, when an individual actuates the doorbell button 254, in response to inputs at the client device 160, or at other times. Further, the processing circuitry 260 can be configured to change the illuminated projection 290 between various display states over time, based on one or more predetermined rules or configuration settings, based on a sequence of events which occur at the doorbell switch 250, the security system 220 (and the control panel 222), the computing system 110, and/or at the client device 160, or other factors. The processing circuitry 260 can also change the illuminated projection 290 between various display states based on motion, light, temperature, or other physical or environmental factors detected by one or more sensors of the doorbell switch 250. Additionally, the processing circuitry 260 can define any number of those display states in connection with a user interface on the client device 160, for example. The display states can be stored in the memory 266 of the doorbell switch 250, in memory of the security system 220, in the client device 160, and/or in the computing system 110.

Among other example display states for the illuminated projection 290, the illuminated projection 290 can include company trade- or service mark displays, time, date, or other calendar-related displays, status indicators (e.g., armed or disarmed indicators of various colors) related to the status of the security system 220, photographs, video feeds, predetermined text messages, etc. Further, in embodiments where the doorbell switch 250 includes a camera, speaker, and/or microphone, the display 286 may be used to generate an illuminated projection of an individual with which another individual standing at the doorbell switch 250 can hold a conversation with. For example, the display 286 may be used to generate an illuminated projection of an individual using the client device 160.

As an example of the operation of the system 10, the processing circuitry 260 can be configured to provide a first or automated display state of the illuminated projection 290 based on one or more rules or predefined conditions defined at the client device 160, state conditions of the security system 220 and/or the computing system 110, time of day conditions, sensor conditions, etc. In that context, it should be appreciated that the automated display state can change over time based on or in response to changes in the operation and/or status of the client device 160, the security system 220, the computing system 110, and time of day conditions, sensor conditions, etc. at the doorbell switch 250. Thus, the processing circuitry 260 can operate in the background to change and/or update the display state of the illuminated projection 290 based on any of those operational conditions regardless of whether (or when) the doorbell button 254 is pressed.

For example, the automated display may change from an "Armed, Active" display to a "Disarmed" display when a user arms and disarms the security system 220. Similarly, the automated display may change from an "Armed, Active" display to a "Disarmed" display if a customer unsubscribes from a security or monitoring service. In that context, the computing system 110 may comprise the backend systems of a service provider and may including a table or listing of subscribing customers. If a customer unsubscribes from service, the computing system 110 can communicate with the doorbell switch 250 to change the automated display state to the "Disarmed" display. In other cases, the automated display may change based on user-interface inputs at the client device 160 using the client application 162, text messages from the client device 160, e-mails from the client device 160, etc.

Upon actuation (e.g., depression) of the doorbell button 254 by an individual, the doorbell 240 may ring and the processing circuitry 260 can execute a predetermined set of operations or rules to update or change the display state of the illuminated projection 290 from the first or automated display state to a second or actuated display state in response to the actuation. The automated and actuated display states can, respectively, be any of the example display states described herein. For example, the automated display state can include a welcome message, such as "We're Home," and the actuated display state can include an attending message such as "Hold On, We're On the Way," as configured in the processing circuitry 260 using the client application 162 at the client device 160. The welcome and attending messages are provided as examples, however, and any other type of message can be defined as the display states. As other examples, the automated display state can be a "dark" or non-illuminated state of the projector 280, and the actuated state can be determined based on one or more operating criteria of the security system 220, such as an armed status.

Further, upon actuation of the doorbell button 254, the processing circuitry 260 can transmit a datagram or other data package to the security system 220, the client device 160, and/or the computing system 110 including an indicator that the doorbell button 254 was pressed. The datagram may include a timestamp, photograph taken from a camera at the doorbell switch 250 when the doorbell button 254 was pressed, and other relevant information captured by buttons and/or sensors at the doorbell switch 250. In turn, one or both of the security system 220 and the security monitoring system 130 may transmit an associated notification to the client device 160 (which may be in addition to a direct notification from the doorbell button 254 to the client device 160). The notification may indicate that the doorbell button 254 has been actuated. In some embodiments, a user of the client device 160 may be provided with an option to submit a reply. The reply may direct the processing circuitry 260 of the doorbell switch 250 to update or modify the actuated display state.

As other examples of the operation of the system 10, the processing circuitry 260 of the doorbell switch 250 can receive, via the communications circuitry 270, system status data from the security system 220. The system status data may indicate the time, the date, or whether the security system 220 is armed, disarmed, calling for fire or police assistance, etc. In response to the system status data, the processing circuitry 260 can direct the projector 280 to project an indication of the system status data, such as the time, in the projected illumination 290. When the doorbell button 254 is pressed, the processing circuitry 260 can also direct the projector 290 to project an indication that the doorbell button 254 was pressed. The indication may identify that the doorbell button 254 was pressed and that one or more individuals are being notified or called (e.g., through the doorbell 240, the security system 220, or using SMS text message, e-mail, etc.). In some embodiments, the processing circuitry 260 can also direct the projector 290 to display a timer, countdown, or other visual display of how much time has passed since the doorbell button 254 was pressed.

Further, when the doorbell button 254 is pressed, the processing circuitry 260 can communicate, via the communications circuitry 270, a door call indicator to the security system 220 and/or the client device 160. The door call indicator may be presented in the form of SMS text message, e-mail, or other notification at the client device 160. In turn, a user of the client device 160 may reply with a door answer response. The door answer response may be embodied as a reply SMS text or e-mail message, for example. The door answer response may be received by the doorbell switch 250 from the client device 160, and the processing circuitry 260 can then direct the projector 280 to project a response to the actuation of the doorbell button 254. In some cases, a two-way voice session can be established between the client device 160 and the doorbell switch 250.

Figure 2:
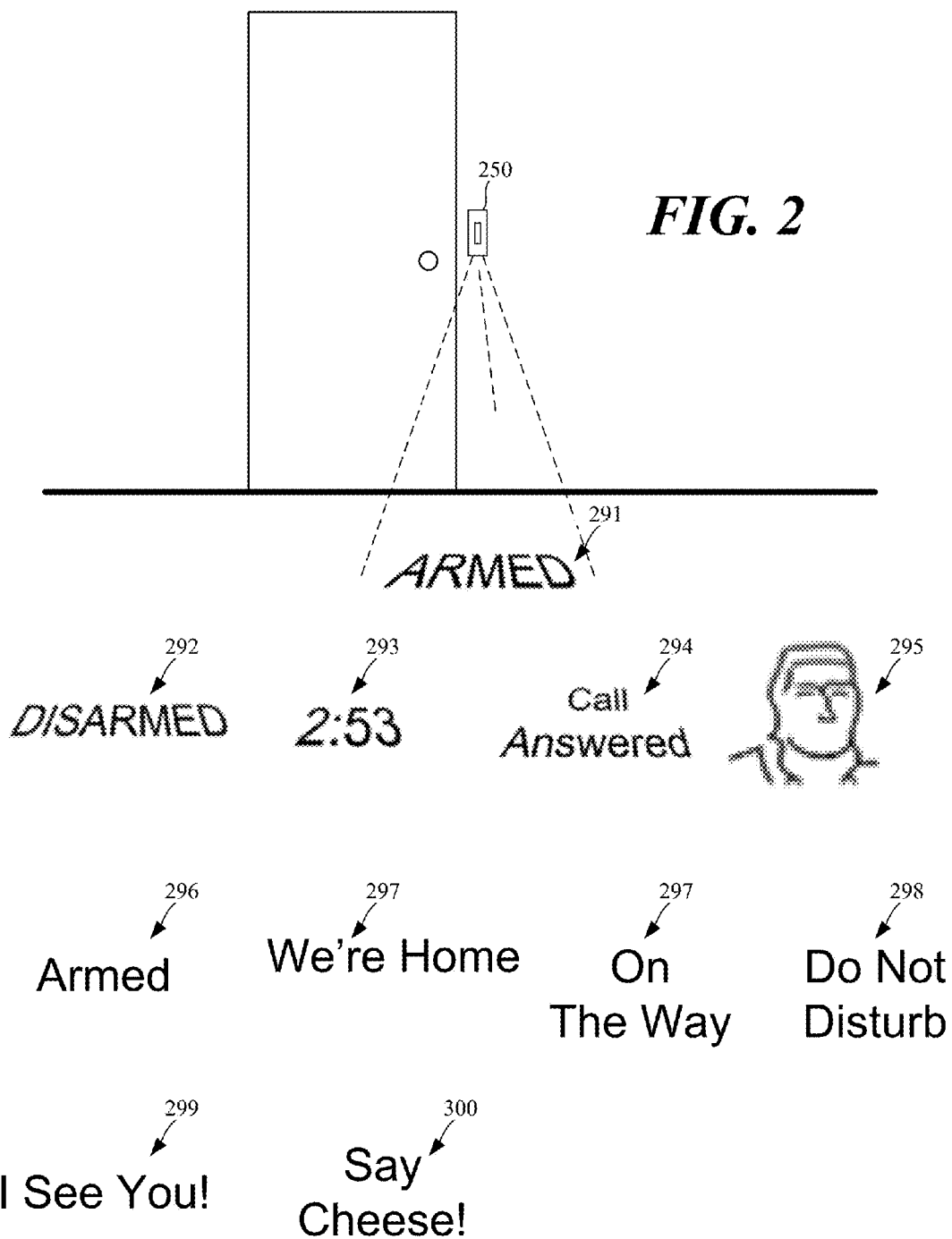
FIG. 2 illustrates examples of illuminated projections or notifications provided by the doorbell switch in FIG. 1 according embodiments of the present disclosure.

Turning to FIG. 2, examples of illuminated projections, display states, or notifications 291-300 provided by the doorbell switch 250 in FIG. 1 are illustrated. As shown in FIG. 2, the illuminated projections may include indicators of armed or disarmed status of the security system 220, for example, as shown at reference numerals 291 and 292, respectively. As other examples, the illuminated projections may include the time or a call (or ring) answered indicator, as shown at reference numerals 293 and 294, respectively. As still another example, the illuminated projections may include the display of an individual using the client device 160, for example, as shown at reference numeral 295. Further, the illuminated projections may include various predetermined messages, such as those shown in reference numerals 296-300.

It is noted that, if ambient sunlight is strong, the doorbell switch 250 may include a small screen or other backing upon which an illuminated projection may display. Such a small screen can be positioned 6 or 8 inches, for example, from the bottom of the doorbell switch 250 so that the illuminated projection from the projector 280 falls brightly upon the screen. It is also noted that, although the projected illuminations are shown in FIG. 2 as extending down to the doorstep, ground, etc., the projector 280 may be mounted so that the projected illuminations shine upon the door, the side of a building, or some other location.

Figure 3:
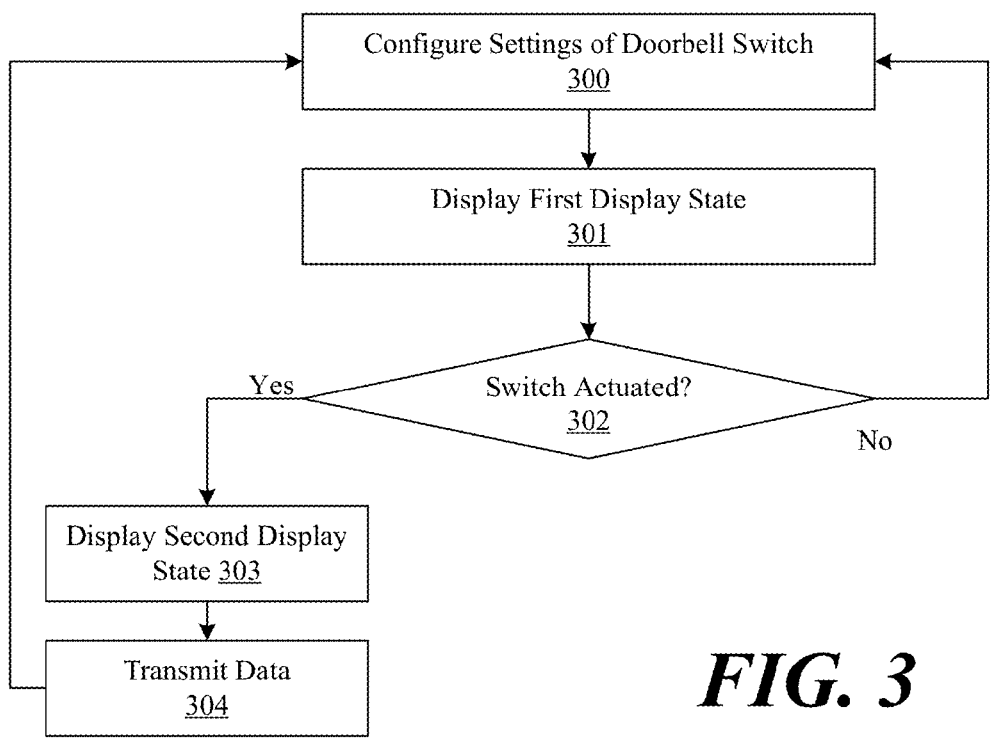
FIG. 3 illustrates an example method of projected doorbell switch notifications according embodiments of the present disclosure.

FIG. 3 illustrates an example method of projected doorbell switch notifications according embodiments of the present disclosure. At step 300, the method includes configuring the settings of the processing circuitry 260 of the doorbell switch 250. The settings can be configured based on communications with and/or predetermined data settings from the client device 160, the security monitoring system 130, and/or the computing system 110 as described herein. At step 301, the method includes displaying the first or automated display state of the illuminated projection 290 based on one or more rules or predefined conditions defined at the client device 160, state conditions of the security system 220 and/or the computing system 110, time of day conditions, sensor conditions, etc. as described herein.

At step 302, the process includes determining whether the doorbell button 254 was actuated. If so, the method proceeds to step 303. If not, the method proceeds back to step 300 (or 301). At step 303, the method includes displaying a second or actuated display state in response to the actuation. The automated and actuated display states can, respectively, be any of the example display states described herein.

Further, upon actuation of the doorbell button 254, at step 304, method includes the processing circuitry 260 transmitting a datagram or other data package to the security system 220, the client device 160, and/or the computing system 110 including an indicator that the doorbell button 254 was pressed. The datagram may include a timestamp, photograph taken from a camera at the doorbell switch 250 when the doorbell button 254 was pressed, and other relevant information captured by buttons and/or sensors at the doorbell switch 250. In turn, one or both of the security system 220 and the security monitoring system 130 may transmit an associated notification to the client device 160 (which may be in addition to a direct notification from the doorbell button 254 to the client device 160). The notification may indicate that the doorbell button 254 has been actuated. In some embodiments, a user of the client device 160 may be provided with an option to submit a reply. The reply may direct the processing circuitry 260 of the doorbell switch 250 to update or modify the actuated display state, which can be updated in steps 300 and/or 301.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A doorbell switch, comprising:
a doorbell switch housing;
a switch to actuate a doorbell;
a projector configured to provide a projected display; and
processing circuitry configured to:
  receive, via a communications transceiver, system status data from a security system;
  direct the projector to project a first indicator based on the system status data;
  in response to actuation of the switch, communicate, via the communications transceiver, a door call indicator to the security system and direct the projector to project a second indicator based on the actuation of the switch; and
  in response to receipt, via the communications transceiver, of a door call response from the security system, direct the projector to project a third indicator based on the door call response.

2. The doorbell switch according to claim 1, wherein the first indicator comprises a status indicator of the security system.

3. The doorbell switch according to claim 1, wherein:
the projector comprises a sheet or lens having an image printed or formed on the sheet or lens; and
the projector is further configured to project an illuminated projection of the image as at least a portion of at least one of the first indicator or the second indicator.

4. A doorbell switch, comprising:
a doorbell switch housing;
a switch to actuate a doorbell;
a charge store configured to store charge from a doorbell circuit;
a projector configured to provide a projected display;
a communications transceiver configured to communicate data over a network; and
processing circuitry configured to:
  receive, via the communications transceiver, system status data from a security system;
  direct the projector to project a first indicator based on the system status data;
  in response to actuation of the switch, communicate, via the communications transceiver, a door call indicator to the security system and direct the projector to project a second indicator based on the actuation of the switch; and
  in response to receipt, via the communications transceiver, of a door call response, direct the projector to project a third indicator based on the door call response.

5. The doorbell switch according to claim 4, wherein:
when the system status data indicates an armed state of the security system, the first indicator comprises an armed indicator; and
when the system status data indicates a disarmed state of the security system, the first indicator comprises a disarmed indicator.

6. The doorbell switch according to claim 4, wherein:
when the system status data indicates an armed state of the security system, the first indicator comprises a first color indicator; and
when the system status data indicates a disarmed state of the security system, the first indicator comprises a second color indicator.

7. The doorbell switch according to claim 4, wherein:
the doorbell switch further includes a camera; and
the processing circuitry is further configured to, in response to actuation of the switch, communicate a photograph taken from the camera to a computing system.

8. The doorbell switch according to claim 4, wherein the second indicator comprises a predetermined message.

9. The doorbell switch according to claim 4, wherein the second indicator comprises a display of elapsed time since actuation of the switch.

10. The doorbell switch according to claim 4, wherein:
the door call response is received from a client device and comprises at least a portion of an SMS or e-mail message; and
the third indicator comprises at least a portion of the SMS or e-mail message.

11. The doorbell switch according to claim 4, wherein:
the projector comprises a sheet or lens having an image printed or formed on the sheet or lens; and
the projector is further configured to project an illuminated projection of the image as at least a portion of at least one of the first indicator or the second indicator.

12. A doorbell switch, comprising:
a switch to actuate a doorbell;
a display device configured to provide an indicator;
a communications transceiver configured to communicate data over a network; and
processing circuitry configured to:
  receive, via the communications transceiver, status data from a monitoring computing system;
  direct the display device to provide a first indicator based on the status data;
  in response to actuation of the switch, communicate, via the communications transceiver, a door call indicator to the monitoring computing system; and
  in response to receipt, via the communications transceiver, of a response from the monitoring computing system, direct the display device to provide a second indicator based on the response.

13. The doorbell switch according to claim 12, wherein:
when the status data indicates an armed state, the first indicator comprises an armed indicator; and when the status data indicates a disarmed state, the first indicator comprises a disarmed indicator.

14. The doorbell switch according to claim 12, wherein:
when the status data indicates an armed state, the first indicator comprises a first color indicator; and
when the status data indicates a disarmed state, the first indicator comprises a second color indicator.

15. The doorbell switch according to claim 12, wherein:
the doorbell switch further includes a camera; and
the processing circuitry is further configured to, in response to actuation of the switch, communicate a photograph taken from the camera to the monitoring computing system.

16. The doorbell switch according to claim 12, wherein the second indicator comprises a predetermined message.

17. The doorbell switch according to claim 12, wherein the second indicator comprises a display of elapsed time since actuation of the switch.

18. The doorbell switch according to claim 12, wherein:
the response is received from a client device and comprises at least a portion of an SMS or e-mail message; and
the second indicator comprises at least a portion of the SMS or e-mail message.

19. The doorbell switch according to claim 12, wherein the display device comprises a projector configured to provide a projected display.

20. The doorbell switch according to claim 19, wherein:
the projector comprises a sheet or lens having an image printed or formed on the sheet or lens; and
the projector is further configured to project an illuminated projection of the image as at least a portion of at least one of the first indicator or the second indicator.

* * * * *